United States Patent Office 3,532,660
Patented Oct. 6, 1970

3,532,660
ELASTIC THERMOPLASTIC MOULDING COMPOUNDS WITH HIGH STABILITY TO HEAT AND LIGHT
Karl-Heinz Ott, Cologne-Stammheim, Karl Dinges, Odenthal, Harry Rohr, Cologne, and Georg Pape, Opladen, Germany, assignors to Farbenfabriken Bayer Aktiengesellschaft, Leverkusen, Germany, a corporation of Germany
No Drawing. Filed Dec. 13, 1966, Ser. No. 601,348
Claims priority, application Germany, Jan. 12, 1966,
F 48,144, F 48,146
Int. Cl. C08c 11/36; C08f 45/36; C08g 51/36; C08k 1/36
U.S. Cl. 260—31.2                                    6 Claims

ABSTRACT OF THE DISCLOSURE

An ABS copolymer composition with high stability to heat and light containing a phenol stabilizer, a fatty acid ester of thiodipropionic acid and a fatty acid ester. It is also contemplated that when the phenol stabilizer is 2,6-di-tertiary-butyl-p-cresol, the fatty acid ester component may be omitted.

---

The known thermoplastic moulding compounds based on copolymers of butadiene, styrene and acrylonitrile have the particular advantage of the combination of high impact strength and high hardness and tensile strength as well as good mouldability. Such copolymer mixtures in addition have very good thermal resistance, especially as regards dimensional stability. However, all these polymers show a more or less pronounced discolouration when they are dried or worked up at elevated temperatures in the presence of atmospheric oxygen. To mask this heat-discolouration of the crude material, very large quantities of pigment are required, especially when it is desired to obtain very bright or pastel colours. A high pigment content causes a deterioration in the mechanical properties, especially the impact strength and notched impact strength. Another disadvantage also arises from the fact that the degree of discolouration on heating cannot be accurately controlled, and thus even where the same conditions of drying and working up are used, there are often great differences in the extent of discolouration on heating so that it is frequently necessary to vary the quantity of pigment from one batch to the next. This involves complications in production.

Numerous substances based on phenols, substituted phenols, substituted diphenols, polyhydroxyphenols, substituted amines, esters of phosphorous acid etc. as well as synergistic mixtures of these components have already been proposed for stabilising thermoplastic moulding compounds of copolymer mixtures of polymers of butadiene, styrene and acrylonitrile. However, these known stabilisers or stabiliser mixtures do not ensure adequate protection where moulding compounds of the above mentioned composition are dried or worked up under the conditions customarily used in practice. Variations in the "initial color," i.e. the color of the as yet unpigmented material occur all the time from batch to batch and cause the above mentioned difficulties.

It has now been found that thermically mouldable elastic synthetic resins based on copolymer mixtures of an elastomeric copolymer or graft polymer of butadiene and a thermoplastic copolymer based on styrene-acrylonitrile are obtained with the good mechanical properties characteristic of these products, excellent heat stability and associated with this a very good stability to light if small quantities of a mixture of:

(a) A stabiliser combination consisting of a phenolic stabiliser and an alkyl ester of thiodipropionic acid and
(b) A fatty acid ester such as butyl stearate is added to such polymer mixtures.

This effect is all the more surprising since such an improvement in stability to heat and light was not observed when other lubricants such as zinc or calcium stearate or the bistearyl amide of ethylene diamine was used. Similarly, an elastic-thermoplastic copolymer mixture is not obtained when the individual components of the synergistic mixture are used. The copolymer mixtures stabilised according to the invention have a complete constant "initial color" and can therefore always be processed with the same quantities of pigment. In particular it has been found that thermoplastically mouldable compounds of the type in question having good heat and light stability are obtained if to a copolymer mixture of:

(A) 5–60% by weight of a rubbery elastic butadiene copolymer or graft polymer and
(B) 95–40% by weight of a thermoplastic component consisting of:
  (a) 50 to 95% by weight of styrene and
  (b) 50 to 5% by weight of acrylonitrile or the alkyl derivatives of these two monomer components in quantities such that the sum of styrene and acrylonitrile in components A and B together must not be less than 50% by weight, there are added:
(C) 0.1–3.0% by weight, based on the total quantity of copolymer mixtures a mixture consisting of:
  (a) a phenolic stabiliser and
  (b) a fatty acid ester of thiodipropionic acid such that the proportion by weight between these two components may be between 1:6 and 6:1, and
(D) 0.3 to 10% by weight, based on the total quantity of copolymer mixture, of a fatty acid ester in which the alcohol components of the ester have 1 to 20 C-atoms and may be branched or straight chained.

According to a preferred embodiment of the present invention, the elastic thermoplastic copolymer mixture consists of:

(A) 5 to 99% by weight, preferably 5 to 60% by weight of a graft copolymer prepared by graft polymerisation of:
  (a) 10–95% by weight, preferably 10–80% by weight of a mixture of:
    (1) 50–90% by weight of styrene and
    (2) 50–10% by weight of acrylonitrile, in which the two components may be partly or entirely replaced by their respective alkyl derivatives, on to
  (b) 90–5% by weight, preferably 90–20% by weight of a polymer of a conjugated diolefin having at least 80% by weight of conjugated diolefine incorporated by polymerisation and
(B) 0–94% by weight, preferably 10–92% by weight of thermoplastic copolymer of:
  (a) 50–95% by weight of styrene and
  (b) 50–5% by weight of acrylonitrile or the alkyl derivatives of these two monomer components, in which the sum of acrylonitrile and styrene in components A and B together must not be less than 50% by weight, and the elastic thermoplastic copolymer mixture defined above is stabilised with
(C) 0.1–0.3% by weight, based on the weight of copolymer mixture, of a mixture of:
  (a) a phenolic stabiliser and
  (b) a fatty acid ester of thiodipropionic acid, the proportion by weight between these two components being between 1:6 and 6:1, and (D) 0.3 to 10% by weight, based on the weight of copolymer mixture, of a fatty acid ester in which the alcohol components of the ester have 1 to 20 carbon atoms and may be straight or branched chain.

From the above it will be seen that the resin-forming monomers (i.e. styrene and acrylonitrile) are preferably blended in the form of a copolymer B with the graft polymer component A, as will also be clear from the preferred ranges mentioned above.

According to one variation of the present invention, instead of using a pure polybutadiene in the rubbery elastic component A, one may also use copolymers of conjugated diolefines with each other, e.g. copolymers of butadiene with isoprene and other 1,3-dienes as well as copolymers of conjugated diolefines with a proportion of up to 30% by weight of a further copolymerisable monovinyl compound such as styrene and/or acrylonitrile. In addition, the rubbery elastic component may be modified in such a way by the addition of small quantities of a monomer which has a cross-linking action, e.g. divinyl benzene, that the component has a gel content (i.e. portion insoluble in toluene) of over 80%.

If one proceeds in accordance with the preferred embodiment, i.e. if the rubbery elastic component A is a graft polymer as described above, then instead of using polybutadiene as graft substrate for the preparation of component A, one may use copolymers of butadiene with isoprene and other 1,3-dienes, as well as copolymers of conjugated diolefines with a proportion of up to 10% of another copolymerisable monovinyl compound such, for example, as styrene and/or acrylonitrile.

Here again styrene and acrylonitrile which are used as graft components may be partly or entirely replaced by alkyl derivatives of these compounds. Similarly, it is also possible to graft a combination of monomers consisting of styrene, acrylonitrile and esters of methacrylic acid. Of particular interest as graft substrates are polymers which contain at least 90% of butadiene, incorporated by polymerisation, and which have a gel content, i.e. the portion insoluble in toluene, of over 80%.

According to a preferred embodiment of the present invention, the graft substrate of the above mentioned graft copolymer component A, i.e. the polymer of a diolefine containing at least 90% of conjugated diolefine consists of a butadiene homopolymer.

As thermoplastic copolymer component B a copolymer of styrene and acrylonitrile is preferably used.

Here again, as in the case of the rubbery elastic component, styrene and acrylonitrile may be entirely or partly replaced by alkyl derivatives of these components, in particular α-methylstyrene and styrenes or methacrylonitrile substituted in the nucleus. Thermoplastic copolymer mixtures of 95 to 65% by weight of styrene and 5 to 35% by weight of acrylonitrile, in which the styrene may be completely replaced by α-methylstyrene are of particular interest.

To protect the above mentioned polymers against the influence of oxygen at elevated temperature or the influence of light in the presence of oxygen, in a preferred embodiment within the scope of the present invention, there is used as stabiliser component C of the synergistic mixture of C+D the combination of a substituted monovalent phenol of the general Formula I

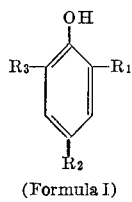

(Formula I)

in which $R_1$, $R_2$ and $R_3$ may be n-alkyl, iso-alkyl or cycloalkyl groups with 1–10 C atoms and in which $R_1$, $R_2$ and $R_3$ may be the same or different, or a substituted diphenol of the general Formula II

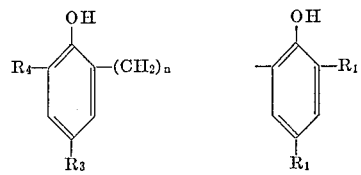

(Formula II)

in which n=1–5 and $R_1$, $R_2$, $R_3$ and $R_4$=n-alkyl, iso-alkyl or cycloalkyl groups and in which $R_1$, $R_2$, $R_3$ and $R_4$ need not all be the same, with a di-ester of thiodipropionic acid of the general Formula III

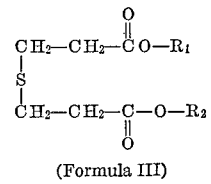

(Formula III)

in which $R_1$ and $R_2$ may be an n-alkyl or iso-alkyl group with 9–20 C-atoms in the hydrocarbon chain and in which the two groups may also be different from each other, in the proportions given. In a preferred embodiment of the present invention, the stabiliser component C used in the synergistically acting mixture C+D is a combination of 2,6-ditertiarybutyl-p-cresol and dilaurylthiodipropionate in the ratio of 1:3 to 3:1.

To protect the above mentioned polymers against the influence of oxygen at elevated temperature or against the influence of light in the presence of oxygen, a fatty acid ester of the general Formula IV is used in the given proportions as stabiliser component or as lubricant component D of the synergistic mixture of C+D within the scope of the present invention.

(Formula IV)

In the above formula, R may be an alkyl group which may be branched or unbranched and preferably contains 10–20 C-atoms and $R_1$ may be an alkyl group which may be branched or unbranched and preferably comprises 1 to 20 C-atoms.

According to a preferred embodiment of the present invention, component D is butyl stearate.

The rubbery elastic component A may be prepared in known manner by emulsion polymerisation of the corresponding monomers. The procedure is in principle the same as that used for the preparation of the resin component B.

If the rubbery elastic component A used is a graft copolymer according to the preferred embodiment of the present invention, polymerisation of the monomers which are to be grafted (styrene and acrylonitrile) may be carried out in the latex of the diolefine (e.g. polybutadiene) which is used as graft substrate. Here again the procedure is in principle the same as in the preparation of resin component B. The graft substrate used in this case is a 1,3-diolefine, preferably a butadiene homopolymer latex or butadiene copolymer latex, containing at least 90% of 1,3-diolefin in the polymer; this is prepared in a basically known manner by emulsion polymerisation of the monomers. In principle, the emulsifying agents, regulating agents, catalysts and electrolytes described for the preparation of B may be used here also, within the limits indicated there.

The thermoplastic copolymer component of styrene and acrylonitrile is preferably prepared by polymerisation of the monomers in aqueous emulsion. The usual quantities of water, emulsifiers, regulating agents, polymerisation catalysts, pH regulators and other additives may be used in this process. The monomer of polymer concentration, for example, amounts to 20 to 50%, i.e. 400 to 100 parts by weight of water are used for 100 parts by weight of monomers.

The following are examples of suitable emulsifiers: Sodium salts, potassium salts and ammonium salts of long chained fatty acids having 10 to 20 carbon atoms; alkyl sulphates having 10 to 20 C-atoms; alkyl sulphonates having 10 to 20 C-atoms; alkylaryl sulphonates having 10 to 20 C-atoms; and resinic acids (e.g. derivatives of abietic acid).

To adjust the molecular weight to the desired value, substances which not as regulators may be used, for example long chained mercaptans such as dodecylmercaptan.

As polymerisation catalysts there may be used inorganic or organic per compounds or azo compounds such as potassium or ammonium persulphate, tertiary butyl hydroperoxide, cumene hydroperoxide or azo diisobutyric acid dinitrile. Redox systems of the mentioned per compounds and reducing agents, especially acids of sulphur of lower valencies such as formaldehyde sulphoxylate, and bases such as triethanolamine etc. may also be used.

As pH regulators there may be added, for example, salts of orthophosphoric acid or pyrophosphoric acid. Polymerisation may be carried out at pH values between about 2 and 11 and is preferably carried at pH 7 to 11.

The polymerization temperature may be about 20 to 100° C., preferably 40 to 90° C.

The addition of stabiliser components C+D to the copolymer component B which is to be used according to the present process and the rubbery elastic component A may in principle be carried out by different methods:

(1) The stabiliser components C may be mixed into the previously dried powders of components A and B, for example by means of a ball mill, and component D may be added only at a later stage of working up. If one employs this procedure, one has to forego the presence of the stabiliser combination C+D during drying.

(2) The stabiliser combination C+D may be worked into the dry powder of the copolymer mixture by means of suitable mixing apparatus such as double screw extruders, roll mills or Banbury mixers, pigments and other lubricants being preferably added at the same time.

(3) According to a preferred embodiment of the present invention, the individual components of stabiliser combination C are mixed in the form of an aqueous emulsion with the mixture of latices of components A and B, preferably at room temperature, and this mixture is then coagulated and dried in known manner. Component D is added only at a later stage of working up on a mixing apparatus of the above mentioned type.

(4) According to another preferred embodiment of the present invention, the individual components of stabiliser components C and component D are mixed in the form of aqueous emulsions with the mixture of latices of components A and B, preferably at room temperature and this mixture is then coagulated in known manner.

The aqueous emulsion of the individual components of stabiliser components C may be prepared by stirring a solution in benzene of the appropriate phenol or thiodipropionic acid ester into an aqueous emulsifier solution by means of a high speed stirrer. The ratio of quantity of water to be used with the benzene solution is suitably between 1:1 and 2:1. The same emulsifiers may be used as those used for the preparation of the rubbery elastic component A or thermoplastic component B (see above). Its quantity is suitably 0.5 to 5%, based on the solution in benzine.

The aqueous emulsion of the components D is in principle prepared in the same way as the individual components of components C although previous dissolving in benzene is in this case not necessary.

Coagulation of the mixtures according to a preferred procedure (see 3 and 4) can in principle be carried out by known methods in which electrolytes, especially salts or acids, are added to the latex mixture and the mixture may if desired be heated to elevated temperatures. The type of coagulating agent to be used depends on the emulsifying agents present in the mixture. In the case of emulsifying agents which are active in both the acid and alkaline range (alkyl sulphates and alkyl sulphonates) electrolytes such as calcium chloride or magnesium sulphate or aluminium sulphate are mainly employed. In the case of an emulsifier which has no emulsifying effect in the acid range, the addition of acid, e.g. acetic acid, is sufficient to bring about coagulation.

Coagulation can also be brought about by cooling the mixture to temperatures below 0° C. ("freezing out").

The coagulates are worked up by procedures analogous to known procedures for working up coagulants of elastic-thermoplastic copolymer mixtures, i.e. the coagulates are separated, washed until free from electrolyte and neutral and dried at a temperature below 100° C., preferably in a vacuum.

The dried material is then compacted and homogenised on suitable apparatus such as mills at temperatures between 130° C. and 180° C. and if desired it is thereafter granulated. The resulting compact moulding compounds which are at the same time stable to heat and light can be moulded in the usual moulding machines such as injection moulding machines or extruders or subjected to other known shaping processes.

The usual fillers, pigments or lubricants, e.g. zinc stearate, calcium stearate or wax may be incorporated into the thermoplastic moulding compounds obtained by the present process.

The moulding compounds prepared according to the invention are distinguished by the fact that in addition to good mechanical properties, they have very good heat stability and associated with this also very good light fastness. This is all the more surprising since the individual components C and D do not show this effect and D has no stabilising effect in the true sense. With the use of the combination specified it is also easily possible to obtain moulding compounds with a constant initial color in the crude state which makes it possible to draw up a recipe for pigmenting which will have general applicability and in which the pigment content can be reduced to a minimum. The stabilisation further ensures that variations in temperature stresses during working up, e.g. injection moulding, extrusion or calendering, cannot affect the given natural color. At the same time, the moulding compounds stabilised by this method are very stable to light of a very wide range of wavelengths.

The following describes a further embodiment of this invention wherein the fatty acid ester (D) is omitted. This may be done successively only in certain specific cases which are illustrated below.

Additionally it has been found that thermoplastically mouldable elastic synthetic resins based on copolymer mixtures of an elastomeric copolymer or graft polymer of butadiene and a thermoplastic copolymer based on styrene-acrylonitrile can be obtained with the good mechanical properties characteristic of these products, excellent thermal stability and associated with this also very good stability to light if relatively small quantities of a mixture of: (a) 2,6-di-tertiary-butyl-p-cresol and (b) a thiodipropionic acid ester are added to such polymer mixtures.

This effect is all the more surprising since the two individual components of this mixture do not produce any improvement in the stability to heat or light when each is used on its own but only when they are used together as a mixture.

The copolymer mixtures stabilised in this way have a complete constant "initial colour" and can therefore always be worked up with the same quantities of pigment. In particular, it has been found that thermoplastically mouldable compounds having good heat and light stability are obtained when:

(A) 5–60% by weight of a rubbery elastic butadiene copolymer or graft polymer and (B) 95–40% by weight of a thermoplastic component consisting of:
(a) 50–95% by weight styrene and (b) 50–5% by weight of acrylonitrile or the alkyl derivatives of these two monomer components, such that the sum of styrene and acrylonitrile in components A and B together is not less than 50% by weight.

(C) 0.1–3% by weight, based on the total weight of copolymer mixture, of a mixture consisting of:
(a) 2,6-di-tertiary-butyl-p-cresol and (b) a thiodipropionic acid ester, in which the proportion by weight between these two components may be 1:6 to 6:1 is added to.

According to a preferred embodiment of the present invention, the stabilised elastic-thermoplastic copolymer mixture consists of:

(A) 5–99% by weight, preferably 5–60% by weight of a graft copolymer prepared by graft polymerisation of:
(a) 10–95% by weight, preferably 10–80% by weight of a mixture of:
(1) 50–90% by weight of styrene and (2) 50–10% by weight of acrylonitrile, in which these two components may be entirely or partly replaced by their alkyl derivatives, to
(b) 90–5% by weight, preferably 90 to 20% by weight of a polymer of a conjugated diolefine containing at least 80% by weight of conjugated diolefine incorporated by polymerisation and (B) 0–94% by weight, preferably 10–92% by weight of a thermoplastic copolymer of:
(a) 50–95% by weight of styrene and (b) 50–5% by weight of acrylonitrile, or the alkyl derivatives of these two monomer components, such that the sum of acrylonitrile and styrene in components A and B taken together is not less than 50% by weight, and this copolymer composed of A and B is stabilised with:

(C) 0.1–3% by weight of a mixture of:
(a) 2,6-di-tertiary-butyl-p-cresol and (b) a thiodipropionic acid ester, in which the proportion by weight between these two components may be 1:6 to 6:1.

From the above it will be clear that the resin-forming monomers, i.e. styrene and acrylonitrile, are preferably blended in the form of a copolymer B with the graft polymer component A, as will also be clear from the above preferred ranges.

According to one variation of the present invention, copolymers of different diolefines conjugated with each other, e.g. copolymers of butadiene with isoprene and other 1,3-dienes as well as copolymers of conjugated diolefins containing up to 30% by weight of another copolymerisable monovinyl compound such as styrene and/or acrylonitrile may be used instead of a pure polybutadiene as the rubbery elastic component A. Furthermore, the rubbery elastic component may be modified in such a way be the addition of relatively small quantities of a monomer which has a cross-linking action, for example divinylbenzene, that the component has a gel content (i.e. a portion insoluble in toluene) of over 80%.

If one operates according to the preferred embodiments, i.e. if the rubbery elastic component A is a graft polymer as already described, above, then copolymers of butadiene with isoprene and other 1,3-dienes as well as copolymers of conjugated diolefines containing up to 10% by weight of another copolymerisable monovinyl compound such as styrene and/or acrylonitrile may be used instead of polybutadiene as graft substrate for the preparation of components A.

Here again the components styrene and acrylonitrile which are to be grafted may be entirely or partly replaced by the alkyl derivatives of these compounds. It is also possible to graft on a monomer combination consisting of styrene, acrylonitrile and esters of methacrylic acid. Of particular interest as graft substrates are polymers containing at least 90% by weight of butadiene incorporated by polymerisation, which polymers have a gel content, i.e. a portion insoluble in toluene, of over 80%.

According to a preferred embodiment of the present invention, the graft substrate of the above mentioned graft polymerisation component A, i.e. the polymer of a diolefine, is a butadiene homopolymer.

As thermoplastic copolymer component B it is advantageous to use a copolymer of styrene and acrylonitrile. However, in the same way as in the case of the rubbery elastic component, one may replace styrene and acrylonitrile entirely or partly by the alkyl derivatives of these components, especially α-methyl styrene and/or styrenes or methacrylonitrile substituted in the nucleus. Of special interest in this context are in particular thermoplastic copolymer mixtures of 95 to 65% by weight of styrene and 5 to 35% by weight of acrylonitrile, the styrene in this mixture being completely replaceable by α-methylstyrene if desired.

To protect the above mentioned polymers against the effect of oxygen at elevated temperatures or light in the presence of oxygen, the stabiliser component C used in a preferred embodiment of the present invention is a combination of 2,6-di-tertiary-butyl-p-cresol

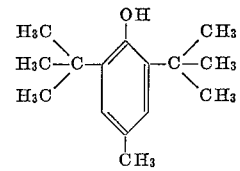

(Formula) I with a diester of thiodipropionic acid of the general formula

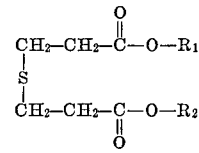

(Formula III)

in the proportions given. In Formula III, $R_1$ and $R_2$ may be n-alkyl or iso-alkyl with 9–20 C-atoms in the hydrocarbon chain and the two radicals may be different from each other.

In another preferred embodiment of the present invention, stabiliser component C is a synergistically acting mixture of 2,6-di-tertiary-butyl-p-cresol and dilaurylthiodipropionate in the proportion by weight of 1:4 to 4:1.

Although other substituted phenols and diphenols give similar effects (see the examples which follow), their effectiveness falls far short of that of the above mentioned combination.

The parts given in the following examples are parts by weight unless otherwise indicated.

EXAMPLE 1

(A) Preparation of the latex mixture 1258 g. of a 27.8% latex of a graft polymer of 36 parts of styrene and 14 parts of acrylonitrile to 50 parts of polybutadiene (average particle size in the latex 0.4μ) are mixed with 1536 g. of a 41.6% latex of a copolymer of 70 parts of styrene and 30 parts of acrylonitrile having a K-value of 59.3 (see Fikentscher, Cellulose-chemi 13 (1932) p. 87) and an intrinsic viscosity of 0.71 to 0.80. The ratio of graft polymer to resin is then 35:65.

(B) Stabilisation

Following this preparation, 25 g. of a 20% aqueous emulsion of 2,6-di-tertiary-butyl-p-cresol, 35 g. of a 20% aqueous emulsion of dilauryl thiodipropionate and 40 g. of an aqueous emulsion of butyl stearate are stirred into the above latex mixture. This mixture thus contains 0.5% of 2,6-di-tertiary-butyl-p-cresol, 0.7% dilauryl thiodipropionate and 2.0% butyl stearate, based on the total quantity of polymer. The polymer mixture stabilised in this way is coagulated with the aid of a 2% acetic acid and the coagulate is separated, washed until neutral and dried in a vacuum at 70 to 80° C.

(C) Preparation of the test samples and testing of the raw tone and thermostability 1000 g. of the polymer mixture stabilised in this way are rolled on a mill at 160° C. after formation of the sheet, a portion amounting each time to ⅓ of the total sample is removed at time intervals of 5, 10 and 20 minutes. These individual sheets are granulated and the granulate is in each case extruded to small sample plates in a single screw injection moulding machine.

The sample plates are examined visually in such a way that both basic paleness=initial colour (natural colour of crude material) and heat stability (colour stability) are taken into account over the entire rolling process. The results are assessed according to the following scale of values

| Assessment | Class |
|---|---|
| Very good | 1 |
| Good | 2 |
| Still suitable | 3 |
| Not suitable as regards colour | 4 |

The natural colour of the crude material (initial colour) and thermostability determined on the moulding compound according to the invention is classified in Table 1 below as 1.

COMPARATIVE EXAMPLE

In this case the polymer mixture already described in Example 1 is stabilised by adding only the emulsion of 2,6-di-tertiary-butyl-p-cresol and the emulsion of dilaurylthiodipropionate in comparison Example A and only butyl stearate emulsion in comparison Example B. Thus in the comparison Example A the polymer mixture only contains 0.5% 2,6-di-tertiary-butyl-p-cresol and 0.7% dilaurylthiodipropionate and in comparison Example B it only contains 2.0% butyl stearate, based on the total solids content of the polymer.

Further working up of the latex mixture, moulding of the moulding compounds to form sample plates and testing of these plates were carried out in the same way as described in Example 1. The initial colour and thermostability values determined are given in Table 1 under A and B respectively.

TABLE 1

| | Experimental Example 1 | Comparison A | Example B |
|---|---|---|---|
| Graft polymer content | 35 | 35 | 35 |
| Copolymer content, styrene-acrylonitrile 70:30 K-value 60; $\eta_i$=0.71–0.80 | 65 | 65 | 65 |
| Percent 2,6-di-tertiary-butyl-p-cresol | 0.5 | 0.5 | |
| Percent dilaurylthiodipropionate | 0.7 | 0.7 | |
| Percent butyl stearate | 2.0 | | 2.0 |
| Initial colour and thermostability class | 1 | 2–3 | 3–4 |

The test carried out on experiment Example B has only been mentioned in order to prove the synergistic effect of the 3-component system. In principle, polymer mixtures of the above mentioned type cannot be stabilised with butyl stearate alone as such moulding compounds have no resistance to ageing.

EXAMPLE 2

25 g. of a 20% aqueous emulsion of 2,2'-methylene-bis-4-methyl-6-cyclohexylphenol, 35 g. of a 20% aqueous emulsion of dilauryl thiodipropionate and 40 g. of a 50% aqueous emulsion of butyl stearate were stirred into the latex mixture already described under A in Example 1.

This mixture thus contain 0.5% of 2,2'-methylene-bis-4-methyl-6-cyclohexylphenol, 0.7% of dilaurylthiodipropionate and 2.0% of butyl stearate based on the total polymer content. The polymer mixture stabilised in this way is coagulated by means of a 2% magnesium sulphate solution, the coagulate is separated, washed free from sulphate and dried in a vacuum at 70 to 80° C. The moulding compositions obtained in this way are tested in the same way as already described in Example 1. The resulting raw tone and thermostability classification is indicated under 2 in Table 2.

COMPARATIVE EXAMPLES C AND D

In this case stabilisation of the polymer mixture already described in Example 1 was carried out by adding only the 20% 2,2'-methylene-bis-4-methyl-6-cyclohexylphenol emulsion to comparative Example C and adding 20% 2,2'-methylene-bis-4-methyl-6-cyclohexylphenol emulsion as well as the 20% dilauryl thiodipropionate emulsion to the comparative Example D. Thus in comparative Example C, the polymer mixture only contains 0.5% of 2,2'-methylene-bis-4-methyl-6-cyclohexylphenol and in comparative Example D it contains 0.5% of this stabiliser as well as 0.7% of dilauryl thiodipropionate, based on the total solid polymer. The latex mixtures are worked up in the same way as already described in Example 2. 2% of bis-stearyl amide of ethylene diamine (based on total polymer) are in each case rolled into the dry powder mixtures by means of a ball mill. The moulding compounds are tested in the same way as already described in Example 1. The initial colour and thermostability values determined are entered under C and D in Table 2.

TABLE 2

| | Experimental Example 2 | Comparison C | Example D |
|---|---|---|---|
| Graft polymer content | 35 | 35 | 35 |
| Copolymer content, styrene-acrylonitrile 70:30, K-value 60; $\eta_i$=0.71–0.80 | 65 | 65 | 65 |
| Percent 2,2'-methylene-bis-4-methyl-6-cyclohexylphenol | 0.5 | 0.5 | 0.5 |
| Percent dilaurylthiodipropionate | 0.7 | | 0.7 |
| Percent butyl stearate | 2.0 | | |
| Percent bis-stearylamide of ethylenediamine | | 2.0 | 2.0 |
| Initial colour and thermostability class | 1–2 | >4 | 4 |

EXAMPLE 3

20 g. calcium stearate are added to 1000 g. of a polymer mixture stabilised according to Example 1 and the mixture of polymer and lubricant is rolled for 12 hours in a ball mill. The homogeneous powder is again rolled on a mill. After formation of the sheet, samples are again removed at intervals of 5, 10 and 20 minutes respectively, one-third of the total quantity being removed in each case. The individual sheets are granulated and the granulate in each case moulded at 200° C. in a single screw injection moulding machine to form small sample plates. The resulting initial colour and thermostability class is indicated under 3 in Table 3.

EXAMPLES 4 AND 5

With the use of the same methods of procedure and the same starting compounds as already described in Example 1, polymer mixture with the following stabilisers are prepared (given in percent based on total polymer);

|  | 2,6-di-tertiary-butyl-p-cresol, percent | Dilauryl-thiodi-propionate, percent | Butyl stearate, percent |
|---|---|---|---|
| Experimental example 4 | 0.5 | 0.7 | 3.5 |
| Experimental example 5 | 0.5 | 0.7 | 5.0 |

The moulding compounds prepared in this way are tested in the same way as already described in Example 1. The resulting initial colour and thermostability data are given under 4 and 5 in Table 3.

TABLE 3

|  | Experimental examples | | |
|---|---|---|---|
|  | 3 | 4 | 5 |
| Graft polymer content | 35 | 35 | 35 |
| Copolymer content, styrene-acrylonitrile 70:30, K-value 60; $\eta_i$=0.71-0.80 | 65 | 65 | 65 |
| Percent 2,6-di-tertiary-butyl-p-cresol | 0.5 | 0.5 | 0.5 |
| Percent dilaurylthiodipropionate | 0.7 | 0.7 | 0.7 |
| Percent butylstearate | 2.0 | 3.5 | 5.0 |
| Percent Ca-stearate | 2.0 | | |
| Initial colour and thermostability class | 1 | 1 | 1 |

EXAMPLE 6

25 g. of a 20% aqueous emulsion 2,6-di-tertiary-butyl-4-nonylphenol, 35 g. of a 20% aqueous emulsion of dilaurylthiodipropionate and 40 g. of a 50% aqueous emulsion of butyl stearate are introduced into the latex mixture already described in Example 1 under A. Based on the total polymer, this mixture thus contains 0.5% of 2,6-di-tertiary-butyl-4-nonylphenol, 0.7% of dilaurylthiodipropionate and 2.0% of butyl stearate. The polymer mixture stabilised in this way is coagulated by means of 2% acetic acid, the coagulate is separated, washed until neutral and dried in a vacuum at 70 to 80° C. The moulding compositions stabilised in this way are tested by the same method as already described in Example 1. The resulting initial colour and thermostability class is indicated under 6 in Table 4.

EXAMPLE 7

A polymer mixture stabilised as follows (based on total polymer) is prepared by a method analogous to that given in the experimental Example 1:

|  | Percent |
|---|---|
| 2,2' - methylene - bis - 4 - methyl - 6 - tertiary-butyl-phenol | 0.25 |
| Dilaurylthiodipropionate | 0.35 |
| Butyl stearate | 2.5 |

The moulding composition stabilised in this way is tested in the same way as already described several times above. The initial colour and thermostability value determined is indicated under 7 in Table 4.

COMPARATIVE EXAMPLE E

If the triple combination consisting of 2,2'-methylene-bis - 4-methyl-6-tertiarybutylphenol, dilaurylthiodipropionate and butyl stearate used in experimental Example 7 is replaced by a dual combination (elimination of the addition of stearate) than the thermostability value obtained is that indicated in Table 4 under E.

|  | Experimental examples | | Comparison Example E |
|---|---|---|---|
|  | 6 | 7 | |
| Graft polymer content | 35 | 35 | 35 |
| Copolymer content, styrene-acrylonitrile 70:30, K-value 60; $\eta_i$=0.71-0.80 | 65 | 65 | 65 |
| Percent 2,6-di-tertiary butyl-4-nonyl phenyl | 0.5 | | |
| Percent 2,2'-methylene-bis-4-methyl 6-tertiary butyl phenol | | 0.25 | 0.25 |
| Percent dilaurylthiodipropionate | 0.7 | 0.35 | 0.35 |
| Percent butyl stearate | 2.0 | 2.0 | |
| Raw tone and thermostability class | 1 | 1-2 | 4 |

EXAMPLE 8

2740 g. of a 30.5% latex of a graft polymer of 36 parts of styrene and 14 parts of acrylonitrile to 50 parts of polybutadiene (average particle size in latex 0.4μ) are mixed with 5070 g. of a 44.6% latex of a copolymer of 69 parts of α-methylstyrene and 31 parts of acrylonitrile having a K-value of 58.5 and an intrinsic viscosity of 0.68 to 0.75. The ratio of graft polymer to resin is then 27:73. 465 g. of a 20% aqueous emulsion of 2,6-di-tertiary butyl-p-cresol and 217 g. of a 20% aqueous emulsion of dilauryl thiodipropionate and 120 g. of a 50% aqueous emulsion of butyl stearate are then stirred into this latex mixture. Based on the total polymer, this mixture thus contains 1.5% of phenolic stabiliser, 0.7% of thiodipropionic acid ester and 2.0% of butyl stearate. The polymer mixture is precipitated by means of a 2% CaCl$_2$ solution. The coagulate obtained is separated, washed free from chloride and dried in a vacuum at 70 to 80° C. The test for initial colour and thermostability is carried out in the same way as already previously described. The result of this test is indicated under 8 in table 5.

COMPARATIVE EXAMPLE F

If the polymer mixture described in example 8 is stabilised only by means of a stabiliser combination consisting of 1.5% by weight of 2,6-di-tertiary butyl-p-cresol and 0.7% of dilauryl thiodipropionate, the value obtained in the thermostability test is that described under F in table 5.

EXAMPLES 9 AND 10

Polymer mixtures with the following stabilisation (indicated in percent, based on total polymer) are prepared with the use of the same methods of procedure and the same starting latices as in Example 1:

|  | 2,6-di-tertiary-butyl-p-cresol, percent | Distearyl-thiodi-propionate, percent | Di-tri-decyl-thiodi-propionate, percent | Butyl stearate, percent |
|---|---|---|---|---|
| Example 9 | 0.5 | 0.7 | | 2.0 |
| Example 10 | 0.5 | | 0.7 | 2.0 |

The moulding compositions according to the invention prepared in this way are tested in the same way as already described in Example 1. The resulting thermostability values are entered under 9 and 10 in table 5.

TABLE 5

|  | Experimental examples | | | Comparison Example F |
|---|---|---|---|---|
|  | 8 | 9 | 10 | |
| Graft polymer content | 27 | 35 | 35 | 27 |
| Copolymer content, styrene-acrylonitrile 70:30, K-value 60;$\eta_i$=0.71-0.80 | | 65 | 65 | |
| Copolymer content, α-methylstyrene-acrylonitrile 69:31, K-value 58.5;$\eta_i$=0.68-0.75 | 73 | | | 73 |
| Percent 2,6-teritiary-butyl-p-cresol | 1.5 | 0.5 | 0.5 | 1.5 |
| Percent dilaurylthiodipropionate | 0.7 | | | 0.7 |
| Percent distearylthiodipropionate | | 0.7 | | |
| Percent ditridecylthiodipropionate | | | 0.7 | |
| Percent butyl stearate | 2.0 | 2.0 | 2.0 | |
| Initial color and thermostability class | 1-2 | 1-2 | 1 | 3 |

EXAMPLES 11, 12, 13 AND 14

With the use of some starting latices as already described in Example 1, mixtures of graft polymer and resin having the following composition are prepared: 20% by weight of graft polymer, 80% by weight of styrene-acrylonitrile resin. The polymer mixtures are again stabilised by the addition of aqueous emulsions of the individual stabilisers. The following stabilising systems were used for this purpose (given in percent, based on total polymer):

|  | Example No. | | | |
| --- | --- | --- | --- | --- |
|  | 11 | 12 | 13 | 14 |
| Percent 2,6-di-tertiary-butyl-p-cresol | 1.0 | 1.0 | 1.0 | 1.0 |
| Percent dilaurylthiodipropionate | 0.5 | 0.5 | 0.5 | 0.5 |
| Percent hexylstearate | 2.0 | | | |
| Percent nonylstearate | | 2.0 | | |
| Percent tridecylstearate | | | 2.0 | |
| Percent stearylstearate | | | | 2.0 |

The moulding compounds stabilised by this method were tested in the same way already described in Example 1. The thermostability values obtained are entered under the columns for the corresponding example in Table 6.

|  | Examples | | | |
| --- | --- | --- | --- | --- |
|  | 11 | 12 | 13 | 14 |
| Graft polymer content | 20 | 20 | 20 | 20 |
| Copolymer content, styrene-acrylonitrile 70:30, K-value 60; $\eta_i$=0.71-0.80 | 80 | 80 | 80 | 80 |
| Percent 2,6-di-tertiary-butyl-p-cresol | 1.0 | 1.0 | 1.0 | 1.0 |
| Percent dilaurylthiodipropionate | 0.5 | 0.5 | 0.5 | 0.5 |
| Percent hexylstearate | 2.0 | | | |
| Percent nonyl stearate | | 2.0 | | |
| Percent Tridecylstearate | | | 2.0 | |
| Percent stearyl stearate | | | | 2.0 |
| Initial color and thermostability class | 1 | 1 | 1–2 | 1–2 |

EXAMPLE 15

(A) *Preparation of a latex mixture.*—1258 g. of a 27.8% latex of a graft polymer of 36 parts of styrene and 14 parts of acrylonitrile to 50 parts of polybutadiene (average particle size in the latex 0.4μ) are mixed with 1536 g. of a 41.6% latex of a copolymer of 70 parts of styrene and 30 parts of acrylonitrile having a K-value of 59.3 (see Fikentscher, Cellulose-chemie 13, 1932, page 8) and an intrinsic viscosity of 0.71 to 0.80. The ratio of graft polymer to resin is then 35:65.

(B) *Stabilisation.*—25 g. of a 20% aqueous emulsion of 2,6-di-tertiary-butyl-p-cresol and 35 g. of a 20% aqueous emulsion of dilaurylthiodipropionate are then stirred into the above latex mixture. This mixture accordingly contains 0.5% of 2,6-di-tertiary-butyl-p-cresol and 0.7% dilaurylthiodipropionate, based on the total polymer. The polymer mixture stabilised in this way is coagulated with a 2% acetic acid, the coagulate is separated, washed until neutral and dried in a vacuum at 70 to 80° C.

(C) *Addition of lubricants.*—2% of the distearylamide of ethylenediamine (based on the quantity of solid polymer) is in each case incorporated into the dry powder mixtures using a ball mill before further working up.

(D) *Preparation of test samples and testing the initial color and thermostability.*—1000 g. of the polymer mixture stabilised and provided with lubricants in this way are rolled on a mill at 160° C. After formation of the sheet, portions are removed from the sample at intervals of 5, 10 and 20 minutes, one third of the total sample being removed in each case. The individual sheets are granulated and the granulate in each case moulded in a single screw injection moulding machine at 200° C. to form small sample plates.

The sample plates are examined visually both for paleness (equal initial color) and for color stability over the whole period of rolling (equal thermostability). The values are assessed according to the following scale of values.

| Asssessment | Class |
| --- | --- |
| Very good | 1 |
| Good | 2 |
| Still suitable | 3 |
| Not suitable as regards colour | 4 |

The initial color and thermostability value determined on the moulding compound according to the invention is indicated under 15 in Table 7.

COMPARATIVE EXAMPLE

In this case stabilisation of the polymer mixture already described in Example 15 is carried out by adding the emulsion of 2,6-di-tertiary-butyl-p-cresol only to the comparative Example A and the emulsion of dilauryl thiodipropionate only to comparative Example B.

Thus in comparative Example A, the polymer mixture contains only 0.5% 2,6-di-tertiary-butyl-p-cresol and in comparative Example B it contains only 0.7% dilauryl thiodipropionate, based on the total polymer solid. Further working up of the latex mixture, subsequent working up of the moulding compounds to form small sample plates and testing of these sample plates are carried out as already described in Example 15. The values determined for initial color and thermostability are given under A and B in Table 7.

TABLE 7

|  | Experimental Example 15 | Comparative examples | |
| --- | --- | --- | --- |
|  |  | A | B |
| Graft polymer content | 35 | 35 | 35 |
| Copolymer content, styrene-acrylonitrile 70:30, K-value 60; $\eta_i$=0.71-0.80 | 65 | 65 | 65 |
| Percent 2,6-di-tertiary-butyl-p-cresol | 0.5 | 0.5 | |
| Percent dilaurylthiodipropionate | 0.7 | | 0.7 |
| Intial color and thermostability class | 1 | 3 | 3 |

The experiment carried out in comparative Example B has only been mentioned in order to demonstrate the synergistic effect of the two-component system. In principle, polymer mixtures of the above mentioned type cannot be stabilised with dilaurylthiodipropionate alone since such moulding compounds have no resistance to ageing.

COMPARATIVE EXAMPLES C, D, E, F, G, H, J AND K

In this series of comparative examples, other phenolic stabilisers instead of 2,6-di-tertiary-butyl-p-cresol used in experimental Example 15 are investigated in combination with dilaurylthiodipropionate. As in experimental Example 15, the ratio of graft polymer to resin is again 35:65. The stabilizer combination is in this case again mixed into the polymer mixture in the form of aqueous emulsions based on the solid polymer, each batch contains 0.5% phenolic stabiliser and 0.7% dilaurylthiodipropionate. The moulding compounds are worked up, dried and processed and the sample plates are tested in the same way as already described in Example 15. The phenolic stabilisers used in the different comparative examples are summarised in the following table.

| Comparative example | Phenolic stabiliser |
| --- | --- |
| C | 2,6-di-tertiary-butyl-4-ethoxyphenol. |
| D | n-Octadecyl-β-(4′-hydroxy-3′,5′-ditertiary-butylphenyl)-propionate. |
| E | n-Octyl-thio-4,6-di(4′-hydroxy-3′, 5′-di-tertiary-butyl)-phenoxytriazine. |
| F | 2,2′-methylene-bis-4-methyl-6-tertiary-butyl-phenol. |
| G | 2,2′-methylene-bis-4-ethyl-6-tertiary-butyl-phenol. |
| H | 2,2′-methylene-bis-4-methyl-6-nonylphenol. |
| J | 4,4′-butylene-bis-(6-tertiary-butyl-m-cresol). |
| K | 4,4′-thio-bis-(6-tertiary-butyl-m-cresol). |

The initial color and thermostability values determined on the sample plates are given under C–K in table 8 below.

TABLE 8

|  | C | D | E | F | G | H | J | K | L |
|---|---|---|---|---|---|---|---|---|---|
| Graft polymer content | 35 | 35 | 35 | 35 | 35 | 35 | 35 | 35 | 35 |
| Copolymer content, styrene-acrylonitril 70:30, K-value 60; $\eta_i$=0.71–0.80 | 65 | 65 | 65 | 65 | 65 | 65 | 65 | 65 | 65 |
| Percent phenolic stabiliser, based on total polymer | 0.5 | 0.5 | 0.5 | 0.5 | 0.5 | 0.5 | 0.5 | 0.5 | 0.5 |
| Percent dilaurylthiodipropionate | 0.7 | 0.7 | 0.7 | 0.7 | 0.7 | 0.7 | 0.7 | 0.7 | 0.7 |
| Percent trinonylphenyl phophite |  |  |  |  |  |  |  |  | 1.5 |
| Initial color and thermostability class | 4 | 2 | 3 | 4 | 3 | 3 | 2 | 3–4 | 2 |

COMPARATIVE EXAMPLE L

In this comparative example, the polymer mixture already described in experimental Example 15 is stabilised by introducing 0.25% 2,2′-methylene-bis-4-methyl-6-tertiary-butylphenol, 0.7% dilaurylthiodipropionate and 1.5% trinonyl phenyl phosphate, based on the solid polymer, in the form of aqueous emulsions into the latex mixture. The moulding compounds are worked up, dried and processed in the same way as has already been fully described in the case of experimental Example 15. The initial color and thermostability value determined with relation to the rolling time is indicated under L in Table 8.

EXPERIMENTAL EXAMPLES 16–20

Polymer mixtures containing the following stabilisers (indicated in percent of the total polymer) are prepared by the same methods of procedure and with the same starting compounds as already described in Example 15:

|  | 2,6-di-tertiary-butyl-p-cresol, percent | Dilaurylthiodipropionate, percent |
|---|---|---|
| Experimental example 16 | 0.3 | 0.45 |
| Experimental example 17 | 0.5 | 0.75 |
| Experimental example 18 | 0.9 | 0.7 |
| Experimental example 19 | 1.2 | 0.7 |
| Experimental example 20 | 1.5 | 0.7 |

The moulding compounds prepared in this way are tested in the same manner as already described in Example 15. The resulting initial color and thermostability values are listed under 16, 17, 18, 19 and 20 in Table 9 below.

TABLE 9

|  | 16 | 17 | 18 | 19 | 20 |
|---|---|---|---|---|---|
| Graft polymer content | 35 | 35 | 35 | 35 | 35 |
| Styrene-acrylonitrile resin K-value 60; $\eta_i$=0.71–0.80 | 65 | 65 | 65 | 65 | 65 |
| Percent 2,6-di-tertiary-butyl-p-cresol | 0.3 | 0.5 | 0.9 | 1.2 | 1.5 |
| Percent dilaurylthiodipropionate | 0.45 | 0.75 | 0.7 | 0.7 | 0.7 |
| Initial color and thermostability class | 1 | 1 | 1 | 1 | 1 |

EXPERIMENTAL EXAMPLES 21 AND 22

Polymer mixtures are prepared with the following stabilisers (indicated in percent, based on total polymer) by the same methods of procedure and with the use of the same starting latices as described in Example 15:

|  | 2,6-di-tertiary-butyl-p-cresol, percent | Distearylthiodipropionate, percent | Di-tridecylthiodipropionate, percent |
|---|---|---|---|
| Example 21 | 0.5 | 0.7 |  |
| Example 22 | 0.5 |  | 0.7 |

The moulding compounds of the invention prepared in this way are tested in the same way as already described in Example 15. The resulting thermostability values are entered under 21 and 22 in Table 10.

TABLE 10

|  | Experimental examples | |
|---|---|---|
|  | 21 | 22 |
| Graft polymer content | 35 | 35 |
| Styrene-acrylonitrile resin 70:30, K-value 60; $\eta_i$=0.71–0.80 | 65 | 65 |
| Percent 2,6-di-tertiary-butyl-p-cresol | 0.5 | 0.5 |
| Percent distearylthiodipropionate | 0.7 |  |
| Percent di-tridecylthiodipropionate |  | 0.7 |
| Initial color and thermostability class | 1–2 | 1 |

EXPERIMENTAL EXAMPLES 23 AND 24

Latex mixtures in which 45 parts of styrene-acrylonitrile resin are used to 55 parts of graft polymer in experimental Example 23 and 90 parts of styrene-acrylonitrile resin are used to 10 parts of graft polymer in experimental Example 24 are prepared with the use of the same latices already described in experimental Example 15. Stabilising, working up, drying and fabricating the moulding compounds into the appropriate test samples are carried out in the same way as already described in Example 15. The initial color and thermostability values determined on the sample plates are indicated under 23 and 24 in Table 11 below.

EXPERIMENTAL EXAMPLE 25

If the latex which has already been described several times above, comprising a graft polymer of 36 parts of styrene and 14 parts of acrylonitrile to 50 parts of polybutadiene (average particle size of polybutadiene 0.4μ) is mixed in such a way with the latex of a copolymer of 70 parts of α-methylstyrene and 30 parts of acrylonitrile (K-value of copolymer 60, $\eta_i$=0.74 to 0.84) that the mixture contains 70 parts of α-methyl-styrene-acrylonitrile resin to 30 parts of graft polymer and the same procedure is used as already described in Example 15 (in this particular case the polymer is precipitated with a 2 $CaCl_2$ solution), then the test samples produced from this stabilised moulding compound show the values given under 25 in table 11 in the thermostability test.

TABLE 11

|  | Experimental examples | | |
|---|---|---|---|
|  | 23 | 24 | 25 |
| Graft polymer content | 55 | 10 | 30 |
| Styrene-acrylonitrile resin 70:30, K-value 60; $\eta_i$=0.71–0.80 | 45 | 90 |  |
| α-methylstyrene-acrylonitrile-resin 70:30, K-value 60, $\eta_i$=0.74–0.84 |  |  | 70 |
| Percent 2,6-di-tertiary-butyl-p-cresol | 0.5 | 0.5 | 0.5 |
| Percent dilaurylthiodipropionate | 0.7 | 0.7 | 0.7 |
| Initial color and thermostability class | 1–2 | 1 | 1–2 |

EXPERIMENTAL EXAMPLE 26

2340 g. of a 29% latex of a graft polymer of 14 parts of styrene and 6 parts of acrylonitrile to 80 parts of polybutadiene (prepared by the process according to French patent specification No. 1,375,331, by grafting on to a polybutadiene latex having an average particle size below 0.1μ (measured with an ultracentrifuge)) are mixed with 5590 g. of a 43.6% latex of a copolymer of 70 parts of styrene and 30 parts of acrylonitrile having a K-value of 60 and an intrinsic viscosity of 0.74 to 0.81. The ratio of graft polymer to resin is then 22:78. This polymer mixture is stabilised by the same procedure as already described several times above. The following components are added, the quantities being based on the total polymer: 0.5% 2,6-di-tertiary-butyl-p-cresol and 0.7% dilaurylthiodipropionate. Working up, drying and producing the test sample for determining the thermostability are carried out in the same way as described in Example 15. The thermostability value found is indicated under 26 in Table 12 below.

TABLE 12

|  | Experimental Example 26 |
|---|---|
| Graft polymer content | 22 |
| Styrene - acrylonitrile resin 70:30 K-value 60; $\eta_1 = 0.74-0.81$ | 78 |
| Percent 2,6-di-tertiary-butyl-p-cresol | 0.5 |
| Percent dilaurylthiodipropionate | 0.7 |
| Initial color and thermostability class | 1 |

We claim:
1. An elastic-thermoplastic moulding composition comprising:
(A) 5–99% by weight of a graft polymer prepared by graft polymerization of:
  (a) 10–95% by weight of a mixture of
    (1) 50–90% by weight styrene, alkyl styrene or a mixture thereof and
    (2) 50–10% by weight acrylonitrile, alkyl acrylonitrile or a mixture thereof onto
  (b) 90–5% by weight of a polymer of butadiene containing at least 80% by weight of polymerized butadiene;
(B) 0–94% by weight of a thermoplastic copolymer of
  (a) 50–95% by weight styrene, alkyl styrene or a mixture thereof and
  (b) 50–5% by weight acrylonitrile, alkyl acrylonitrile or a mixture thereof wherein the amount of polymerized styrene, alkyl styrene, acrylonitrile and alkyl acrylonitrile in the mixture of (A) and (B) is at least 50% by weight;
(C) 0.1–3% by weight, based on the weight of (A) plus (B) of a mixture of a phenol of the formula

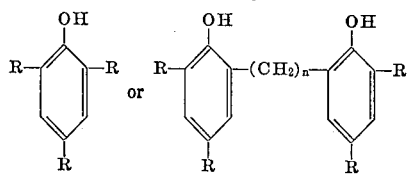

wherein each R is alkyl or cycloalkyl having 1 to 10 carbon atoms and $n$ is an integer of from 1 to 5 and an ester of the formula

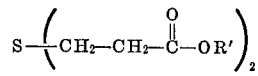

wherein each R' is alkyl having 9 to 20 carbon atoms, the weight ratio of said phenol to said ester being from 1:6 to 6:1 and
(D) 0.3–10% by weight, based on the weight of (A) plus (B), of an ester of the formula

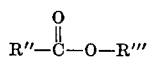

wherein R" is alkyl having 10 to 20 carbon atoms and R''' is alkyl having 1 to 20 carbon atoms.

2. An elastic-thermoplastic moulding composition comprising:
(A) 5–60% by weight of a graft polymer prepared by graft polymerization of:
  (a) 10–80% by weight of a mixture of
    (1) 50–90% by weight styrene, alkyl styrene or a mixture thereof and
    (2) 50–10% by weight acrylonitrile, alkyl acrylonitrile or a mixture thereof onto
  (b) 90–20% by weight of a polymer of butadiene containing at least 80% by weight of polymerized butadiene;
(B) 10–92% by weight of a thermoplastic copolymer of
  (a) 50–95% by weight styrene, alkyl styrene or a mixture thereof and
  (b) 50–5% by weight acrylonitrile, alkyl acrylontrile or a mixture thereof wherein the amount of polymerized styrene, alkyl styrene, acrylonitrile and alkyl acrylonitrile in the mixture of (A) and (B) is at least 50% by weight;
(C) 0.1–3% by weight, based on the weight of (A) plus (B) of a mixture of a phenol of the formula

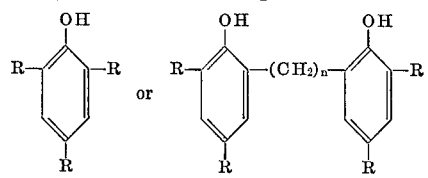

wherein each R is alkyl or cycloalkyl having 1 to 10 carbon atoms and $n$ is an integer of from 1 to 5 and an ester of the formula

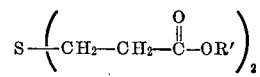

wherein each R' is alkyl having 9 to 20 carbon atoms, the weight ratio of said phenol to said ester being from 1:6 to 6:1 and
(D) 0.3–10% by weight, based on the weight of (A) plus (B), of an ester of the formula

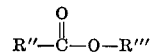

wherein R" is alkyl having 10 to 20 carbon atoms and A''' is alkyl having 1 to 20 carbon atoms.

3. The elastic-thermoplastic of claim 2 wherein (C) is a mixture of 2,6-di-tertiary-butyl-p-cresol and dilaurylthiodipropionate in a weight ratio of 1:3 to 3:1 and (D) is butyl stearate.

4. An elastic-thermoplastic moulding composition comprising:
(A) 5–99% by weight of a graft polymer prepared by graft polymerization of:
  (a) 10–95% by weight of a mixture of
    (1) 50–90% by weight styrene, alkyl styrene or a mixture thereof and
    (2) 50–10% by weight acrylonitrile, alkyl acrylonitrile or a mixture thereof onto
  (b) 90–5% by weight of a polymer of butadiene containing at least 80% by weight of polymerized butadiene;
(B) 0–94% by weight of a thermoplastic copolymer of
  (a) 50–95% by weight styrene, alkyl styrene or a mixture thereof and
  (b) 50–5% by weight acrylonitrile, alkyl acrylonitrile or a mixture thereof wherein the amount of polymerized styrene, alkyl styrene, acrylonitrile and alkyl acrylonitrile in the mixture of (A) and (B) is at least 50% by weight and
(C) 0.1–3% by weight, based on the weight of (A) plus (B) of a mixture of 2,6-di-tertiary-butyl-p-cresol and a thiodipropionic acid ester in which the esterifying moiety is alkyl having 9 to 20 carbon atoms, the weight ratio of said cresol to said thiodipropionic acid ester is 1:6 to 6:1.

5. An elastic-thermoplastic moulding composition comprising:
(A) 5–60% by weight of a graft polymer prepared by graft polymerization of
  (a) 10–80% by weight of a mixture of (1) 50–90% by weight styrene, alkyl styrene or a mixture thereof and
(2) 50–10% by weight acrylonitrile, alkyl acrylonitrile or a mixture thereof onto
(b) 90–20% by weight of a polymer of butadiene containing at least 80% by weight of polymerized butadiene;
(B) 10–92% by weight of a thermoplastic copolymer of
(a) 50–95% by weight styrene, alkyl styrene or a mixture thereof and
(b) 50–5% by weight acrylonitrile, alkyl acrylonitrile or a mixture thereof wherein the amount of polymerized styrene, alkyl styrene, acrylonitrile and alkyl acrylonitrile in the mixture of (A) and (B) is at least 50% by weight and
(C) 0.1–3% by weight, based on the weight of (A) plus (B) of a mixture of 2,6-di-tertiary-butyl-p-cresol and a thiodipropionic acid ester in which the esterifying moiety is alkyl having 9 to 20 carbon atoms, the weight ratio of said cresol to said thiodipropionic acid ester is 1:6 to 6:1.

6. The elastic-thermoplastic moulding composition of claim 5 wherein said ester is dilaurylthiodipropionate and said weight ratio is 1:4 to 4:1.

References Cited
UNITED STATES PATENTS

| | | | |
|---|---|---|---|
| 2,941,978 | 6/1960 | Roche et al. | |
| 2,957,833 | 10/1960 | Baum. | |
| 3,267,069 | 8/1966 | Cummings | 260—876 |
| 3,294,868 | 12/1966 | Pritchard | 260—45.85 |
| 3,406,136 | 10/1968 | Scarso et al. | |
| 3,414,636 | 12/1968 | Ott et al. | 260—893 |

ALLAN LIEBERMAN, Primary Examiner

U.S. Cl. X.R.

260—45.85, 45.95